United States Patent
Qin et al.

(10) Patent No.: US 12,524,148 B2
(45) Date of Patent: Jan. 13, 2026

(54) DISPLAY APPARATUS AND ELECTRONIC DEVICE

(71) Applicant: Shenzhen Yinwang Intelligent Technologies Co., Ltd., Shenzhen (CN)

(72) Inventors: Zhentao Qin, Dongguan (CN); Lei Mao, Shenzhen (CN); Zhiyong Huang, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 60 days.

(21) Appl. No.: 18/588,925

(22) Filed: Feb. 27, 2024

(65) Prior Publication Data

US 2024/0201844 A1  Jun. 20, 2024

Related U.S. Application Data

(63) Continuation of application No. PCT/CN2022/110100, filed on Aug. 3, 2022.

(30) Foreign Application Priority Data

Aug. 28, 2021 (CN) .......................... 202110999055.8

(51) Int. Cl.
*G06F 3/04886* (2022.01)
*G03B 21/28* (2006.01)
*G06T 11/00* (2006.01)
*B60K 35/23* (2024.01)

(52) U.S. Cl.
CPC ......... *G06F 3/04886* (2013.01); *G03B 21/28* (2013.01); *G06T 11/00* (2013.01); *B60K 35/23* (2024.01); *B60K 2360/25* (2024.01)

(58) Field of Classification Search
CPC .. G06F 3/04886; G06F 1/1639; G06F 3/0421; G06F 3/0488; G06F 2203/04109; G03B 21/28; G06T 11/00; B60K 2360/25; B60K 35/23; B60K 35/00; B60K 35/10; B60K 2360/1438; B60K 2360/334
See application file for complete search history.

(56) References Cited

U.S. PATENT DOCUMENTS

| | | | |
|---|---|---|---|
| 2007/0296644 A1* | 12/2007 | Hong | G02B 30/52 345/4 |
| 2009/0128716 A1 | 5/2009 | Nagashima et al. | |
| 2010/0253618 A1 | 10/2010 | Nishigaki et al. | |
| | (Continued) | | |

FOREIGN PATENT DOCUMENTS

| | | | | |
|---|---|---|---|---|
| CN | 1577235 A | | 2/2005 | |
| CN | 103727951 A | * | 4/2014 | ......... G01C 21/3605 |
| | (Continued) | | | |

*Primary Examiner* — Ricardo Osorio
(74) *Attorney, Agent, or Firm* — Leydig, Voit & Mayer, Ltd.

(57) ABSTRACT

A apparatus includes a picture generation unit, an enlarging and display unit, and a touch control unit. The picture generation unit is configured to generate a source image. The enlarging and display unit is configured to enlarge the source image generated by the picture generation unit. In addition, the picture generation unit is further configured to generate and project a touchscreen. The touch control unit is configured to detect and respond to a touch operation performed by a user on the touchscreen.

20 Claims, 8 Drawing Sheets

(56) References Cited

U.S. PATENT DOCUMENTS

| | | |
|---|---|---|
| 2010/0302511 A1 | 12/2010 | Kang et al. |
| 2013/0201225 A1 | 8/2013 | Choi et al. |
| 2017/0003854 A1 | 1/2017 | Lin et al. |
| 2018/0267685 A1 | 9/2018 | Zhang et al. |
| 2023/0266588 A1* | 8/2023 | Zhou ..................... B60K 35/60 345/7 |

FOREIGN PATENT DOCUMENTS

| | | | | |
|---|---|---|---|---|
| CN | 104298405 B | | 7/2017 | |
| CN | 108513156 A | | 9/2018 | |
| CN | 112639581 A | | 4/2021 | |
| CN | 114815241 A | * | 7/2022 | ............. B60K 35/00 |
| CN | 112639581 B | * | 9/2022 | ......... G02B 27/0101 |
| DE | 102014211339 A1 | * | 12/2015 | ......... G02B 27/0101 |
| JP | 2004120698 A | | 4/2004 | |
| JP | 2009260531 A | | 11/2009 | |
| JP | 2012032465 A | | 2/2012 | |
| JP | 2012194501 A | | 10/2012 | |
| JP | 2015031835 A | | 2/2015 | |
| JP | 2018205764 A | | 12/2018 | |
| WO | WO-9828649 A1 | * | 7/1998 | ............. B60K 35/10 |
| WO | 2005119357 A1 | | 12/2005 | |
| WO | 2012172363 A2 | | 12/2012 | |

* cited by examiner

DISPLAY APPARATUS AND ELECTRONIC DEVICE

CROSS-REFERENCE TO RELATED APPLICATIONS

This application is a continuation of International Application No. PCT/CN2022/110100, filed on Aug. 3, 2022, which claims priority to Chinese Patent Application No. 202110999055.8, filed on Aug. 28, 2021. The disclosures of the aforementioned applications are hereby incorporated by reference in their entireties.

TECHNICAL FIELD

This application relates to the field of image display, and in particular, to a display apparatus.

BACKGROUND

A virtual image display apparatus, also referred to as a virtual image display, can effectively enlarge a source image by increasing an image distance and display the enlarged source image, thereby relieving visual fatigue caused by viewing an ordinary display up close. The virtual image display has developed rapidly in recent years.

A principle of virtual image display is that when a source image is placed within a focus of a display element, an upright enlarged virtual image located in a distance may be formed on a same side of the source image. When the source image gradually approaches the focus, the virtual image becomes larger. Finally, when the source image is at the focus, the virtual image is at an optical infinity distance.

An existing virtual image display apparatus usually uses a physical button for human-machine interaction. The physical button has a large volume, and an interaction interface cannot be flexibly configured. Therefore, interaction efficiency is low, and experience is poor.

SUMMARY

In view of this, embodiments of this application provide a display apparatus, a transportation means, and an electronic device, to provide a touch control function.

According to a first aspect, the display apparatus provided in this application may include a picture generation unit, an enlarging and display unit, and a touch control unit.

The picture generation unit is arranged to (configured to) generate a source image. The enlarging and display unit is arranged to (configured to) enlarge the source image generated by the picture generation unit. In addition, the picture generation unit is further configured to generate and project a touchscreen. The touch control unit is arranged to (configured to) detect and respond to a touch operation performed by a user on the touchscreen.

In the display apparatus provided in this application, the picture generation unit corporates with the touch control unit to project the touchscreen, and detect and respond to the touch operation performed by the user on the touchscreen, thereby achieving a touch control function.

In a possible implementation, the picture generation unit includes a first light source, a first imaging module, and a first touch projection module. The first light source is configured to output a first light beam to the imaging module and output a second light beam to the touch projection module. The first imaging module is configured to generate the source image based on the first light beam. The first touch projection module is configured to generate and project the touchscreen based on the second light beam.

In this implementation, the first imaging module and the first touch projection module share the first light source, and generate the source image and the touchscreen respectively, thereby saving overall space and reducing costs.

In a possible implementation, the picture generation unit includes a second light source, a second imaging module, and a second touch projection module. The second light source is configured to output a light beam to the second imaging module, the second imaging module is configured to generate the source image and the touchscreen based on the input light beam, and the second touch projection module is configured to project the touchscreen.

In this implementation, the second imaging module may generate the source image and the touchscreen based on the input light beam. In this solution, a function of the second imaging module is fully utilized, and no independent element is needed to generate the touchscreen and the source image, thereby saving overall space and reducing costs.

According to a second aspect, this application further provides a display apparatus. The display apparatus includes a picture generation unit and a touch control unit. The picture generation unit is configured to generate a source image and a touchscreen, and project the source image and the touchscreen outwards.

The touch control unit is configured to detect and respond to a touch operation performed by a user on the touchscreen.

According to a third aspect, this application provides an electronic device. The electronic device includes the display apparatus according to the first aspect or the second aspect.

According to a fourth aspect, this application further provides a picture generation unit (which may be referred to as a light machine). The picture generation unit includes a first light source, a first imaging module, and a first touch projection module.

The first light source is configured to output a first light beam to the first imaging module and output a second light beam to the first touch projection module. The first imaging module is configured to generate the source image based on the first light beam. The first touch projection module is configured to generate and project the touchscreen based on the second light beam.

According to a fifth aspect, this application provides another picture generation unit. The picture generation unit includes a second light source, a second imaging module, and a second touch projection module. The second light source is configured to output a light beam to the second imaging module, the second imaging module is configured to generate the source image and the touchscreen based on the input light beam, and the second touch projection module is configured to project the touchscreen.

According to a sixth aspect, this application further provides a display apparatus. The display apparatus includes the picture generation unit according to the fourth aspect or the fifth aspect.

According to a seventh aspect, this application further provides a transportation means. The transportation means includes the display apparatus according to the first aspect. The display apparatus is mounted on a seat of the transportation means.

The following implementations may be applicable to embodiments according to any one of the foregoing aspects.

In a possible implementation, the first light source includes a three-color light source and a semi-reflection and semi-transmission wave plate. The semi-reflection and semi-transmission wave plate is located on an optical path of three-color light output by the three-color light source, and is configured to transmit and reflect the three-color light emitted by the three-color light source. A reflected light is the first light beam, and a transmitted light is the second light beam.

In a possible implementation, the semi-reflection and semi-transmission wave plate is a monochromatic semi-reflection and semi-transmission wave plate.

In a possible implementation, the first touch projection module includes a projection lens and a light filter, the second light beam is input into the projection lens, and the light filter is located on a light-emitting side of the projection lens. In this way, the projection lens projects out the touchscreen by using the light filter.

In a possible implementation, the first touch projection module further includes a mechanism for adjusting a distance between the light filter and the projection lens. By using the adjustment mechanism, a size of the projected touchscreen may be adjusted.

In a possible implementation, the first touch projection module includes a reflector configured to reflect the second light beam to the projection lens. The reflector implements light bending, and further reduces space occupied by the display apparatus.

In a possible implementation, the touch control unit is further configured to generate a control signal (or an operation instruction), and then send the control signal to the picture generation unit and/or the enlarging and display unit.

In a possible implementation, the touch control unit includes a signal transmission module and a signal detection module, the signal transmission module is configured to transmit an infrared signal or a laser signal to the touchscreen, and the signal detection module is configured to detect a signal reflected after the user touches the touchscreen.

In a possible implementation, the touch control unit further includes a signal processing module. The signal processing module receives the signal that is reflected after the user touches the touchscreen and that is detected by the signal detection module, and processes the detected signal to generate a control signal (or an operation instruction).

In a possible implementation, the signal detection module in the touch control unit may generate a control signal, and then send the control signal to the picture generation unit and/or the enlarging and display unit based on a transmitted signal, to implement display control on the display apparatus, for example, to adjust content, or picture brightness and contrast of the source image generated by the picture generation unit.

In a possible implementation, the enlarging and display unit in the display apparatus includes a curved mirror, and the curved mirror is configured to enlarge and reflect the generated source image, to form an enlarged virtual image.

In a possible implementation, the enlarging and display unit in the display apparatus includes a projection lens, and the projection lens is configured to project the source image generated by the picture generation unit outwards.

In a possible implementation, the enlarging and display unit further includes a diffusion element, and the diffusion element is configured to receive the source image generated by the picture generation unit and diffusely reflect the source image to the curved mirror. In this implementation, the diffusion element is added, so that the source image generated by the picture generation unit can be evenly reflected to the curved mirror, thereby enhancing a display effect.

In a possible implementation, the picture generation unit includes a projection assembly, and the projection lens is configured to project the source image to a projection screen.

In a possible implementation, the display apparatus further includes a polarizing film. The polarizing film is located behind the diffusion element, and can filter out stray light of an environment.

In a possible implementation, the display apparatus further includes a directional diffusion film, the directional diffusion film is located behind the diffusion element, and the directional diffusion film is configured to enlarge a transverse scattering angle of the source image obtained by performing a diffuse reflection, to increase a viewing angle of the display apparatus.

In a possible implementation, the curved mirror is a multifocal curved mirror or an arbitrarily curved mirror.

In a possible implementation, the source image is generated in a first area of the second imaging module, and the touchscreen is generated in a second area of the second imaging module.

In a possible implementation, phase information loaded to the first area and the second area of the second imaging module is different, and the first area and the second area of the second imaging module are modulated by using different phase information respectively, to generate different content, in other words, to generate the source image and the touchscreen.

In a possible implementation, the second imaging module alternately displays the source image and the touchscreen. In other words, the second imaging module generates the source image and the touchscreen in a time division multiplexing manner.

In a possible implementation, the second imaging module projects the generated source image into a third area, and projects the touchscreen into a fourth area.

In a possible implementation, the third area overlaps the fourth area, or the third area and the fourth area are independent of each other, or the third area includes the fourth area.

In a possible implementation, the first imaging module or the second imaging module includes a display circuit and an imaging component. The display circuit receives a decoded image signal, and drives (or controls) the imaging component to perform optical-to-electrical conversion on the light beam emitted by the first light source or the second light source, to generate a visual image.

DETAILED DESCRIPTION OF ILLUSTRATIVE EMBODIMENTS

Figure 1A:
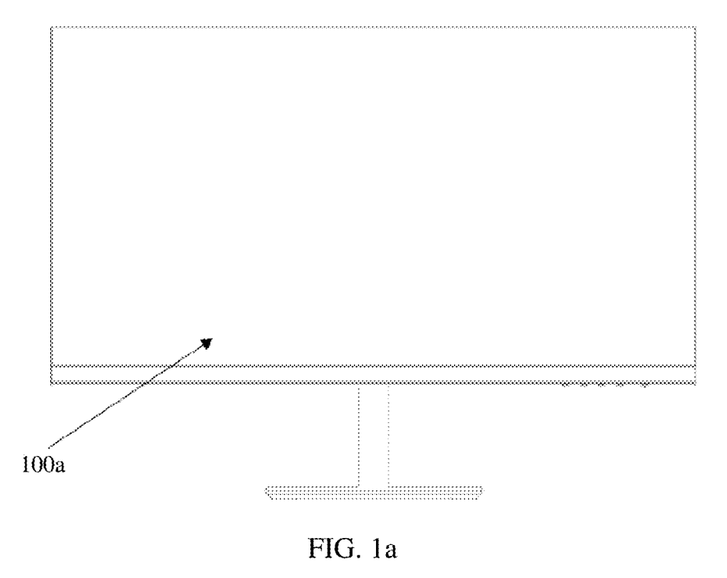
FIG. 1a is a schematic diagram of a display apparatus used as an ordinary display according to an embodiment of this application.
Figure 1B:
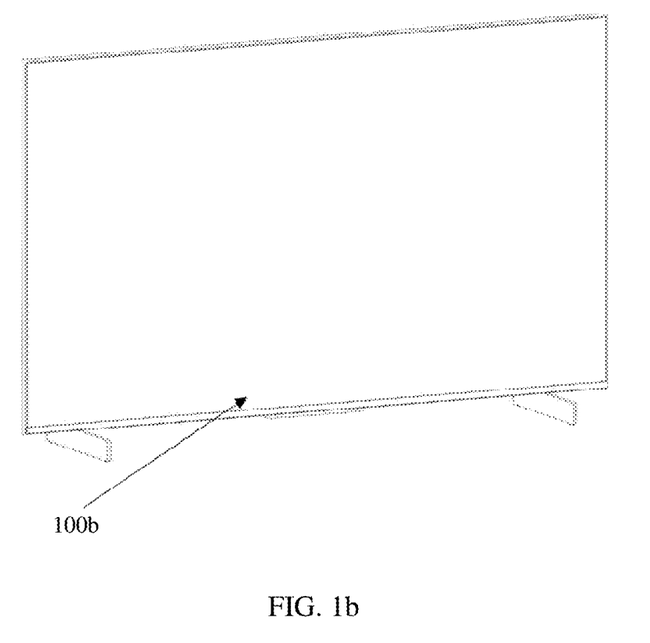
FIG. 1b is a schematic diagram of a display apparatus used as a television according to an embodiment of this application.
Figure 1C:
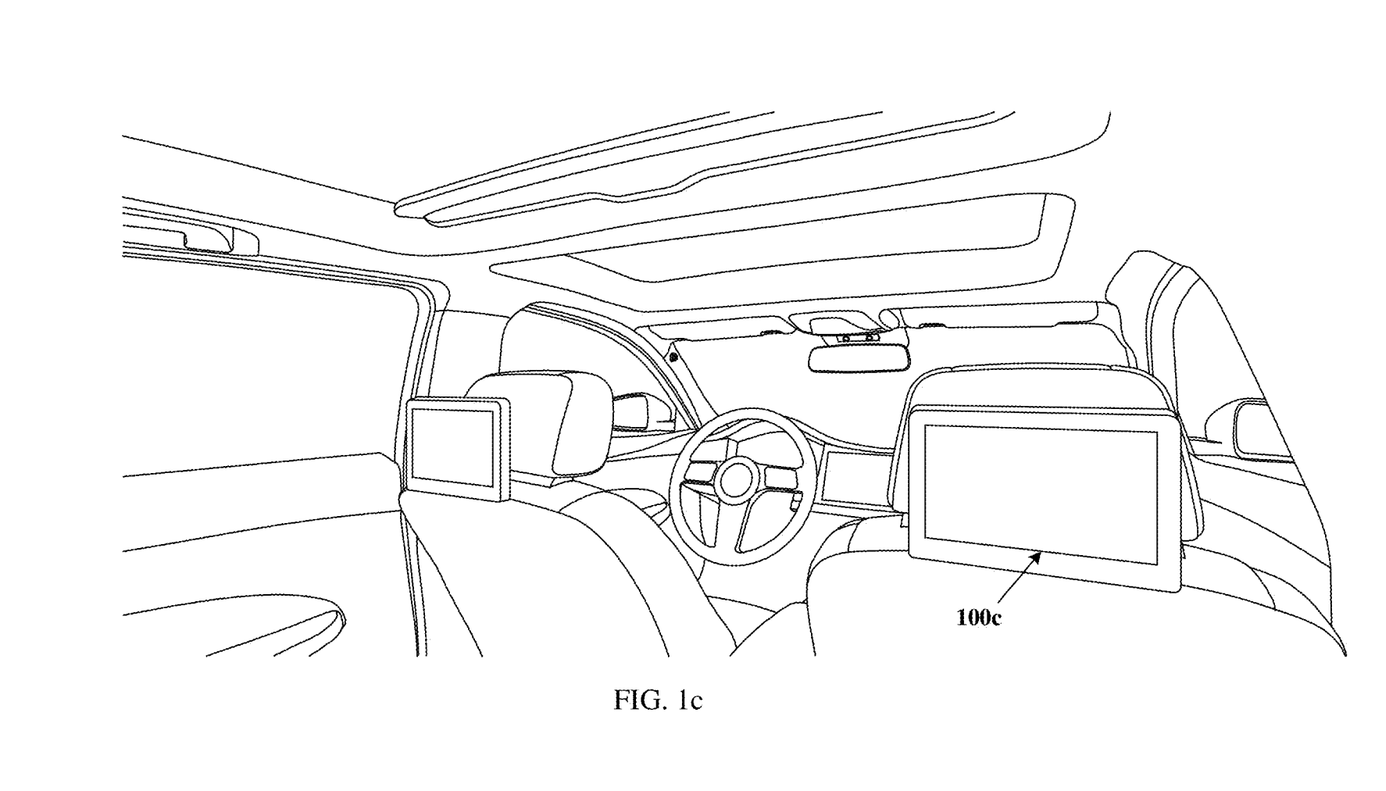
FIG. 1c is a schematic diagram of a display apparatus used as a vehicle-mounted display according to an embodiment of this application.
Figure 1D:
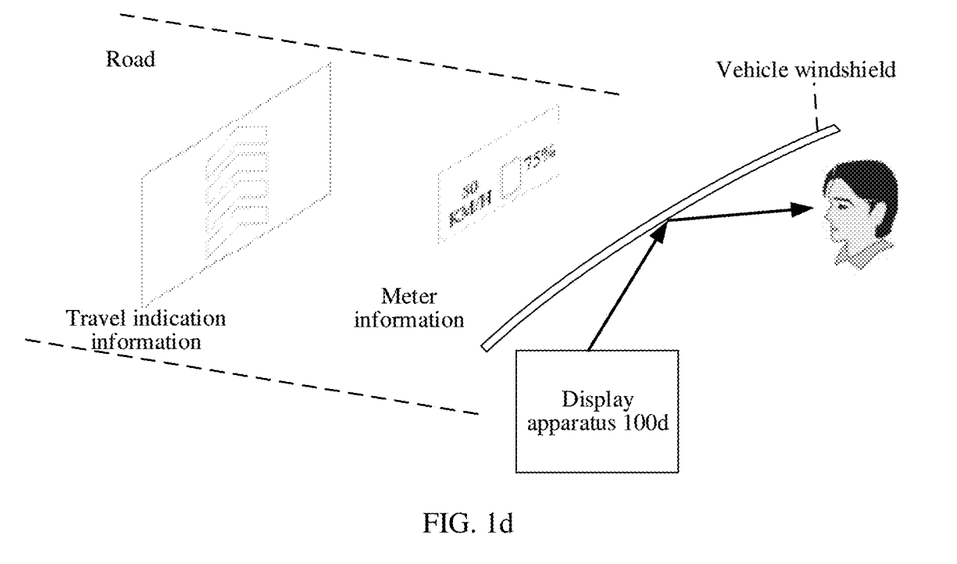
FIG. 1d is a schematic diagram of a display apparatus used as a head-up display according to an embodiment of this application.
Figure 1E:
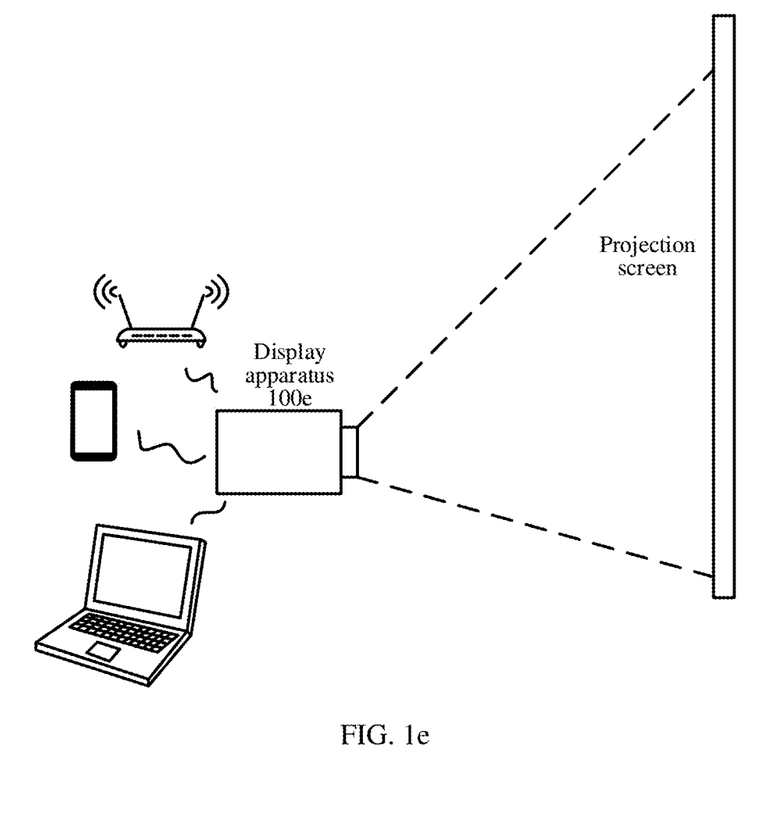
FIG. 1e is a schematic diagram of a display apparatus used as a projection device according to an embodiment of this application.

This application provides a display apparatus. The display apparatus can implement virtual image display, and further reuse some optical assemblies that implement virtual image display, to achieve a touch control function. The display apparatus may be used for office work as an ordinary display (as shown in 100a in FIG. 1a), or may be used as a television (as shown in 100b in FIG. 1b) for home entertainment, or may be used as a vehicle-mounted display (as shown in 100c in FIG. 1c, where the display apparatus is mounted on a seat of a vehicle), or may be used as a head-up display (HUD) mounted on a vehicle, as shown in 100d in FIG. 1d. In addition, the display apparatus provided in embodiments may also be used as a projector (projection machine), as shown in 100e in FIG. 1e. A physical size, a display size, and resolution of the display apparatus may be adjusted depending on an application scenario. When the display apparatus in embodiments is used as the HUD, the display apparatus may display meter information, travel indication information of a vehicle, and/or the like. Content (for example, an image source) displayed by the display apparatus is reflected to human eyes by a windscreen, and the human eyes can view the displayed content. The display apparatus provided in this application may achieve a touch control function.

In this application, the display apparatus may also be referred to as a display system or a virtual image display apparatus. Units or modules included in the display apparatus may be referred to as assemblies or mechanisms.

Figure 2:
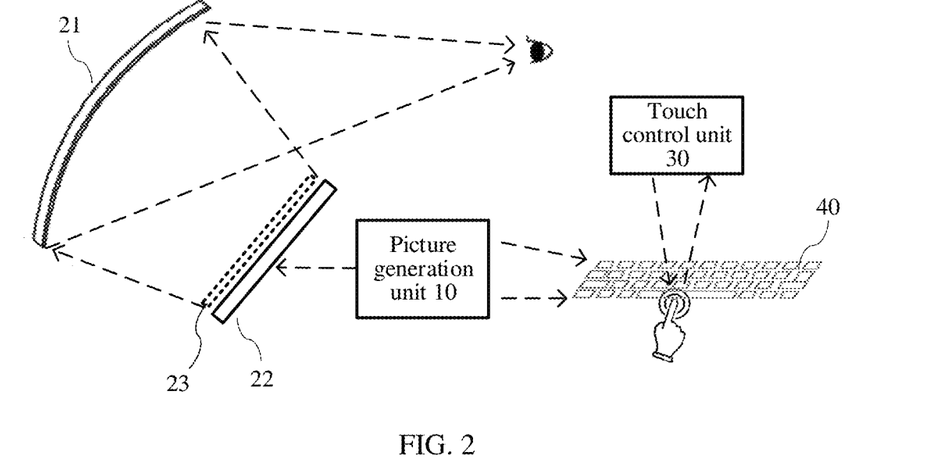
FIG. 2 is a schematic diagram of a structure of a display apparatus according to an embodiment of this application.

FIG. 2 is a schematic diagram of a structure of a display apparatus according to an embodiment of this application. As shown in FIG. 2, the display apparatus includes a picture generation unit (PGU) 10, enlarging and display units (which may include enlarging and display units 21, 22, and 23), and a touch control unit 30. The picture generation unit 10 may receive an input video signal, and generate a source image. The enlarging and display unit enlarges the source image and forms an enlarged virtual image. In addition, the picture generation unit 10 further generates and projects a touchscreen 40. The touch control unit 30 detects and responds to a touch operation performed by a user on the touchscreen 40, to achieve a touch control function.

Specifically, the touch control unit 30 may generate a control signal based on the touch operation performed by the user on the touchscreen 40, and then send the control signal to the picture generation unit 10. The picture generation unit 10 adjusts the generated source image based on the control signal, for example, adjusts dimensions (size), brightness, and contrast.

Still refer to FIG. 2. The enlarging and display unit may specifically include a curved mirror 21 configured to enlarge and reflect the generated source image, to form an enlarged virtual image. In addition, the enlarging and display unit may further include the diffusion element 22 and the polarizing film 23. The diffusion element 22 receives the source image generated by the picture generation unit 10 and diffusely reflects the source image to the curved mirror 21. The polarizing film 23 is located behind the diffusion element 22, and is configured to eliminate environmental interference light, to prevent the environmental interference light from being absorbed by the curved mirror 21.

The display apparatus provided in this application may further include a directional diffusion film (not shown in FIG. 2). The directional diffusion film may be located behind the diffusion element 22 (for example, located between the diffusion element 22 and the polarizing film 23), and is configured to enlarge a transverse scattering angle of the source image obtained by performing a diffuse reflection.

In the display apparatus provided in this application, the picture generation unit 10 may project the generated source image and the generated touchscreen to a same area or to different areas. As shown in FIG. 2, the picture generation unit 10 projects the generated source image left, and projects the generated touchscreen right. The generated source image and the generated touchscreen are separated from each other. The picture generation unit 10 may alternatively project the generated source image and the touchscreen to a same area. The touchscreen may overlap or cross the source image. In this case, the touchscreen is overlaid on the source image in an on screen display (OSD) manner.

Figure 3:
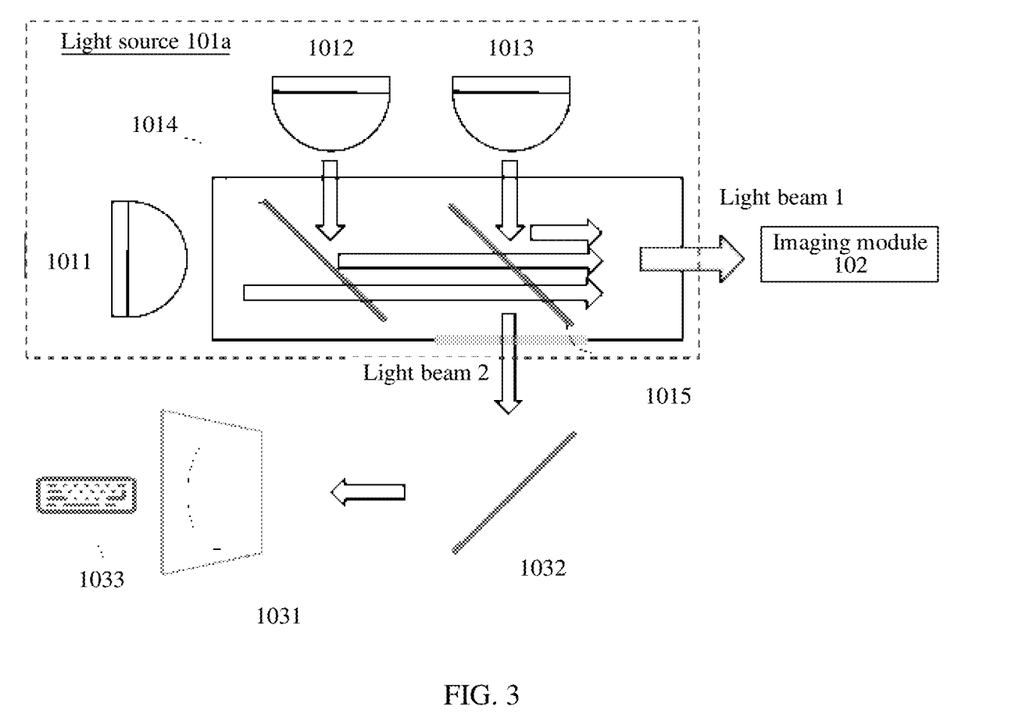
FIG. 3 is a schematic diagram of a structure of a picture generation unit according to an embodiment of this application.

FIG. 3 is a schematic diagram of a structure of a picture generation unit (which may be referred to as a light machine) according to an embodiment of this application.

As shown in FIG. 3, the picture generation unit 10 includes a light source 101a, an imaging module 102, and first touch projection modules (which may include first touch projection modules 1031, 1032, and 1033). The picture generation unit 10 may be used in the foregoing display apparatus, or may be used independently.

The light source 101a in this embodiment outputs a first light beam (a light beam 1) to the imaging module 102, and the light source 101a further outputs a second light beam (a light beam 2) to the first touch projection module. The imaging module 102 may generate the source image based on the first light beam, and the first touch projection module generates and projects the touchscreen based on the input second light beam.

Specifically, the first touch projection module in this embodiment includes a projection lens 1031 and a light filter 1033. The light beam 2 emitted by the light source 101a is input to the projection lens 1031, and the light filter 1033 is located on a light-emitting side of the projection lens. After the light beam 2 passes through the light filter 103, a touchscreen 40, for example, a keyboard operation interface, may be projected. In addition, to fold an optical path to save space, the first touch projection module may further include the reflector 1032. The reflector 1032 reflects the light beam 2 to the projection lens 1031.

Specifically, the imaging module 102 in this embodiment may be a liquid crystal on silicon (LCOS) display, an organic light-emitting diode (OLED) display, a liquid crystal display (LCD), a digital light processing (DLP) display, or a micro-electro-mechanical systems (MEMS) display.

The light source 101a in this embodiment may include a three-color light source (a blue light source 1011, a green light source 1012, and a red light source 1013). White light output after mixing monochromatic light emitted by the three-color light source (which may be referred to as a tricolor light source) is the first light beam, and the first light beam is input to the imaging module 102, to generate the source image. The three-color light source may further output the monochromatic light or the white light. For example, the red light source 1013 outputs red light (the second light beam). The monochromatic light is input to the first touch projection module, to project a monochromatic touchscreen 40. The light source 101a may further include a first wave plate 1014 and a second wave plate (semi-reflection and semi-transmission wave plate) 1015. The blue light source 1011, the green light source 1012, and the red light source 1013 may be light-emitting diode 9LED) light sources, or may be laser diode light sources.

The first wave plate 1014 is located on an optical path of light output by the light sources bon and 1012, and is configured to transmit and reflect the light. For example, the first wave plate 1014 transmits blue light emitted by the light source 1011 and reflects green light emitted by the light source 1012. The reflected light and the transmitted light are mixed and then input into the second wave plate 1015.

The second wave plate 1015 is also located on an optical path of three-color light output by the three-color light source (1011, 1012, and 1013), and is configured to transmit and reflect the three-color light. For example, the second wave plate 1015 transmits blue light emitted by the light source 1011, transmits green light emitted by the light source 1012, and reflects and transmits red light emitted by the light source 1013. The reflected red light and the two paths of transmitted light (the blue light and the green light) are mixed into the first light beam. The red light that is emitted by the light source 1013 and that is transmitted through the second wave plate 1015 is the second light beam.

Further, the second wave plate 1015 may be a monochromatic wave plate, and a color of the second wave plate 1015 is consistent with a color of light emitted by the light source 1013. For example, the second wave plate 1015 is a red wave plate.

Figure 4:
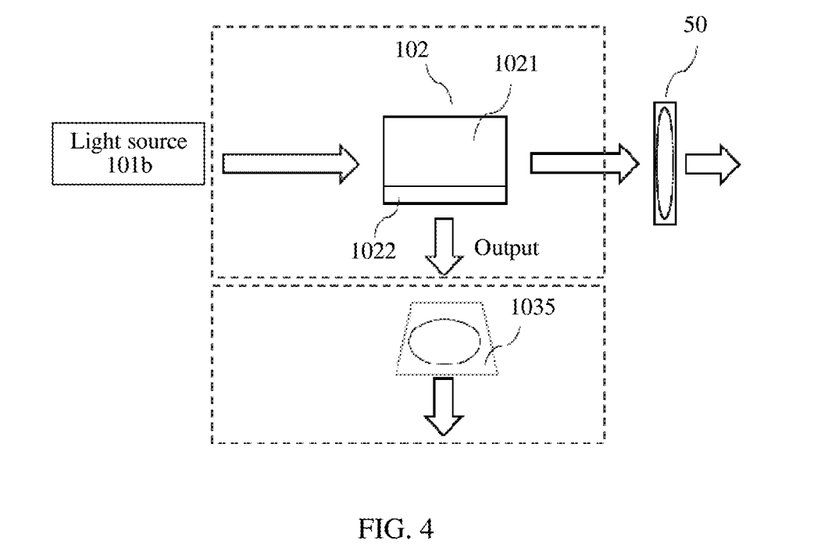
FIG. 4 is a schematic diagram of a structure of another picture generation unit according to an embodiment of this application.

FIG. 4 is a schematic diagram of a structure of another picture generation unit according to an embodiment of this application.

As shown in FIG. 4, the picture generation unit 10 includes a light source 101b, an imaging module 102 (shown in a dashed box), and a second touch projection module (which may be a touch projection lens 1035). The picture generation unit 10 may be used in the foregoing display apparatus, or may be used independently.

The light source 101b outputs a light beam (which may be white light) to the imaging module 102, and the imaging module 102 generates the source image and the touchscreen (for example, a keyboard interface) based on the input light beam.

Specifically, the source image is generated in a first area 1021 of the imaging module 102, and the touchscreen is generated in a second area 1022. The source image generated in the first area 1021 is output to the outside, for example, to a display lens 50 of the display apparatus. The touchscreen generated in the second area 1022 is output to the outside, for example, to the second touch projection module.

The second touch projection module may be specifically the touch projection lens 1035. The touch projection lens 1035 projects the input touchscreen outward, for example, to a desktop on which the display apparatus is placed, for users to use.

The foregoing provides a solution for generating the source image and the touchscreen in different areas (1021 and 1022) of the imaging module 102. The imaging module 102 may alternatively display the source image and the touchscreen in a time division manner, that is, a time division multiplexing solution for the imaging module 102.

In comparison with the embodiment shown in FIG. 3, in this embodiment, the source image and the touchscreen are generated by using a same imaging module 102, thereby saving overall space and reducing costs.

Figure 5:
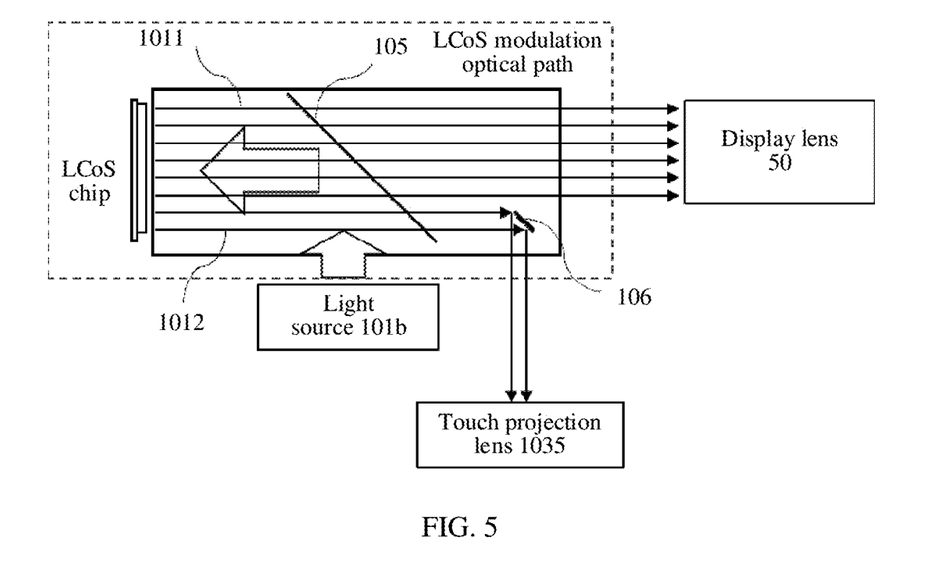
FIG. 5 is a schematic diagram of imaging of a picture generation unit in a display apparatus according to an embodiment of this application.

Refer to FIG. 5. An example in which the imaging module 102 is an LCOS chip is used in FIG. 5 to describe an imaging principle diagram of the picture generation unit.

An LCOS modulation optical path is configured to perform optical modulation, for example, phase modulation, on the LCOS chip to display an image. A modulation principle of the LCD is similar to that of the LCOS, and details are not described here again. As shown in a dashed box in the figure, the LCOS modulation optical path includes a semi-reflection and semi-transmission element 105, a reflection element 106, and the LCOS chip (or referred to as an LCOS display). After being reflected by the semi-reflection and semi-transmission element 105, light input by the light source 101b (shown by a large arrow) enters a surface of the LCOS chip, and the LCOS chip performs imaging based on the input light, to generate the source image and the touchscreen.

As shown in FIG. 5, the source image is generated in a part of the LCOS, and the touchscreen is generated in the other part of the LCOS. In FIG. 5, the source image is generated in an upper half area, and the touchscreen is generated in a lower half area. In another scenario, the source image may be generated in a left area of the LCOS, and the touchscreen may be generated in a right area. In other words, different images are generated in different areas. This is not limited in embodiments.

After passing through the semi-reflection and semi-transmission element 105, light 1011 of the source image is output to the display lens 50 of the display apparatus, and the display lens 50 may further transmit the light to the enlarging and display unit. After passing through the semi-reflection and semi-transmission element 105, light 1012 of the touchscreen is reflected by the reflection element 106, and then enters the touch projection lens 1035. The touch projection lens 1035 may further project the touchscreen outwards.

Figure 6A:
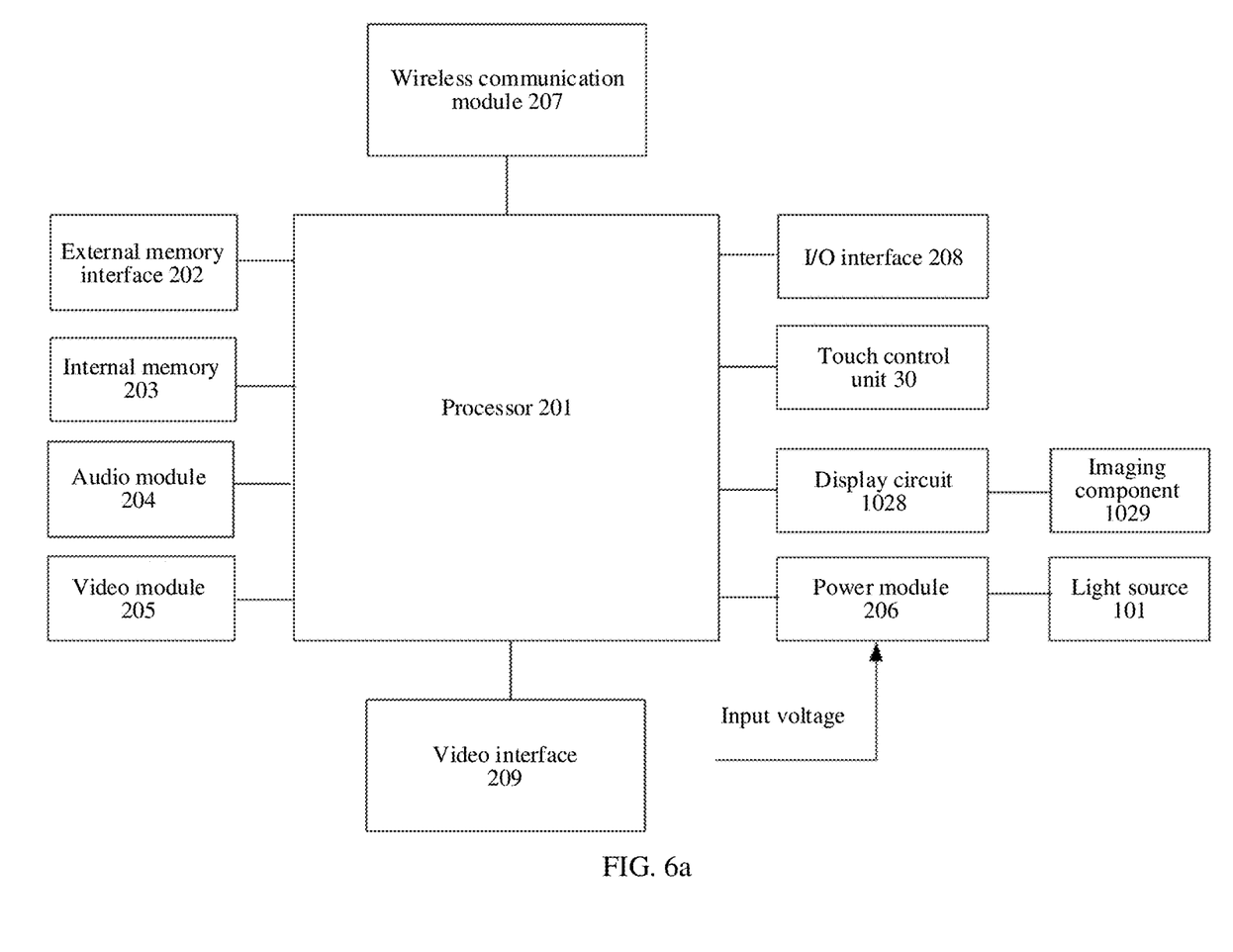
FIG. 6a is a schematic diagram of a circuit of a display apparatus according to an embodiment of this application.
Figure 6B:
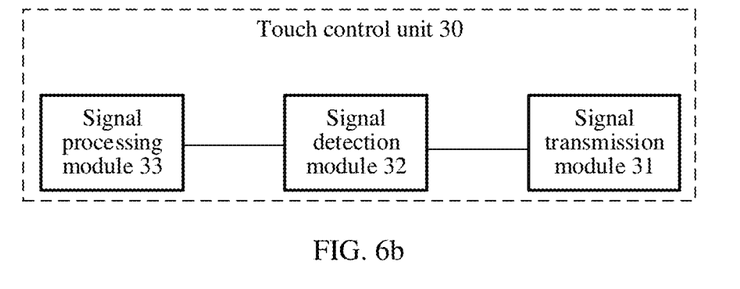
FIG. 6b is a schematic diagram of a circuit of a touch control unit in a display apparatus according to an embodiment of this application.

Refer to FIG. 6a and FIG. 6b. FIG. 6a is a schematic diagram of a circuit of a display apparatus according to this application, and FIG. 6b is a schematic diagram of a circuit of a touch control unit in the display apparatus according to this application.

As shown in FIG. 6a, the circuit in the display apparatus mainly includes a processor 201, an external memory interface 202, an internal memory 203, an audio module 204, a video module 205, a power module 206, a wireless communication module 207, an I/O interface 208, a video interface 209, a touch control unit 30, a display circuit 1028, an imaging component 1029, and the like. The processor 201 and peripheral elements, such as the external memory interface 202, the internal memory 203, the audio module 204, the video module 205, the power module 206, the wireless communication module 207, the I/O interface 208, the video interface 209, the touch control unit 30, and the display circuit 1028, may be connected by using a bus. The processor 201 may be referred to as a front end processor.

In addition, the schematic circuit diagram in embodiments of this application does not constitute a specific limitation on the display apparatus. In some other embodiments of this application, the display apparatus may include more or fewer parts than those shown in the figure, or some parts may be combined, or some parts may be divided, or different part arrangements may be used. The parts shown in the figure may be implemented by hardware, software, or a combination of software and hardware.

The processor 201 includes one or more processing units. For example, the processor 201 may include an application processor (AP), a modem processor, a graphics processing unit (GPU), an image signal processor 9ISP), a controller, a video codec, a digital signal processor (DSP), a baseband processor, and/or a neural network processing unit (NPU). Different processing units may be independent components, or may be integrated into one or more processors.

A memory may be further disposed in the processor 201, and is configured to store instructions and data. In some embodiments, the memory in the processor 201 is a cache. The memory may store instructions or data just used or cyclically used by the processor 201. If the processor 201 needs to use the instructions or the data again, the processor 201 may directly call the instructions or the data from the memory, thereby avoiding repeated accesses, reducing a wait time of the processor 201, and improving system efficiency.

In some embodiments, the display apparatus may further include a plurality of input/output (I/O) interfaces 208 connected to the processor 201. The interface 208 may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. The I/O interface 208 may be connected to a device such as a mouse, a touchpad, a keyboard, a camera, a speaker/loudspeaker, or a microphone, or may be connected to a physical button (such as a volume button, a brightness adjustment button, or a power-on/off button) on the display apparatus.

The external memory interface 202 may be configured to be connected to an external memory card, for example, a micro SD card, to expand a storage capability of the display apparatus. The external storage card communicates with the processor 201 through the external memory interface 202, to implement a data storage function.

The internal memory 203 may be configured to store computer-executable program code, and the executable program code includes instructions. The internal memory 203 may include a program storage area and a data storage area. The program storage area may store an operating system, an application program needed by at least one function (such as a call function or a time setting function), and the like. The data storage area may store data (such as a phone book and universal time) created during using the display apparatus, and the like. In addition, the internal memory 203 may include a high-speed random-access memory, and may further include a non-volatile memory, for example, at least one magnetic disk storage device, a flash memory, or universal flash storage (UFS). The processor 201 runs the instructions stored in the internal memory 203 and/or instructions stored in a memory disposed in the processor 201, to execute various functional applications of the display apparatus and data processing.

The display apparatus may implement audio functions such as music playback and calling by using the audio module 204, the application processor, and the like.

The audio module 204 is configured to convert digital audio information into an analog audio signal for output, and is also configured to convert analog audio input into a digital audio signal. The audio module 204 may be further configured to encode and decode an audio signal, for example, perform voice playing or recording. In some embodiments, the audio module 204 may be disposed in the processor 201, or some function modules in the audio module 204 are disposed in the processor 201.

The video interface 209 may receive audio and video input from the outside, and may be specifically a high definition multimedia interface (HDMI), a digital visual interface (DVI), a video graphics array (VGA), a display port (DP), and the like. The video interface 209 may further output a video to the outside.

The video module 205 may decode the video input to the video interface 209, for example, perform H.264 decoding. The video module may further encode a video collected by the display apparatus, for example, perform H.264 encoding on a video collected by an external camera. In addition, the processor 201 may also decode the video input to the video interface 209, and then output a decoded image signal to the display circuit.

The display circuit 1028 and the imaging component 1029 are configured to display a corresponding image. In embodiments, the video interface 209 receives an externally input video source signal. The video module 205 performs decoding and/or digitization processing and then outputs an image signal to the display circuit 1028. The display circuit 1028 drives, based on the input image signal, the imaging component 1029 to perform imaging on a light beam emitted by the light source 101*a* or 101*b*, to generate a visual image. For example, the imaging component 1029 generates the source image and the touchscreen. The display circuit 1028 and the imaging component 1029 are electronic elements in the imaging module 102, and the display circuit 1028 may be referred to as a drive circuit.

The power module 206 is configured to supply power to the processor 201 and a light source 101 based on input power (for example, a direct current). The power module 206 may include a rechargeable battery, and the rechargeable battery may supply power to the processor 201 and the light source 101. Light emitted by the light source 101 may be transmitted to the imaging component 1029 for imaging, to form an image optical signal. The light source 101 may be the light sources 101*a* and 101*b* in the foregoing embodiments.

The wireless communication module 207 may enable the display apparatus to perform wireless communication with the outside, and may provide wireless communication solution such as a wireless local area network (WLAN) (such as a wireless fidelity (Wi-Fi) network), Bluetooth (BT), a global navigation satellite system (GNSS), frequency modulation (FM), a near field communication (NFC) technology, and an infrared (IR) technology. The wireless communication module 207 may be one or more components integrating at least one communication processing module. The wireless communication module 207 receives an electromagnetic wave via an antenna, performs frequency modulation and filtering on an electromagnetic wave signal, and sends a processed signal to the processor 201. The wireless communication module 207 may further receive a to-be-sent signal from the processor 201, and perform frequency modulation and amplification on the signal. The amplified signal is converted into an electromagnetic wave and radiated out via the antenna.

In addition, in addition to using the video interface 209 to input video data decoded by the video module 205, the video data may be received in a wireless manner by using the wireless communication module 207 or read from an external memory. For example, the display apparatus may receive the video data from a terminal device or vehicle-mounted entertainment system by using a wireless local area network in a vehicle, and the display apparatus may alternatively read audio and video data stored in the external memory.

The touch control unit 30 may generate a control signal (for example, a brightness/contrast adjustment signal) based on a touch operation performed by a user on the touchscreen 40, and then send the control signal to the display circuit 1028 by using the processor 201. The display circuit 1028 adjusts imaging of the imaging component 1029 based on the control signal, to change the displayed touchscreen and/or the displayed source image.

As shown in FIG. 6*b*, the touch control unit 30 may include a signal transmission module 31, a signal detection module 32, and a signal processing module 33. The signal transmission module 31 may transmit an infrared signal or a laser signal to a touch area (covering the touchscreen). When a finger or another object touches the touch area, the infrared signal or the laser signal is scattered on a surface of an object. A part of the infrared signal or the laser signal is received by the signal detection module 32, and then is sent to the signal processing module 33 for processing, for example, converted into information such as coordinates or a motion trend. The signal processing module 33 feeds back the processed signal to the processor 201. The processor 201 sends an image signal to the display circuit 1028 based on the input signal (for example, the coordinates information or the motion trend), and the imaging component 1029 displays the received image signal.

The signal detection module 32 and the signal processing module 33 in the touch control unit 30 may be integrated together. In other words, an integrated module simultaneously implements signal detection and processing functions. In addition, the touch control unit 30 in embodiments may be integrated with the picture generation unit, to save space.

Figure 7:
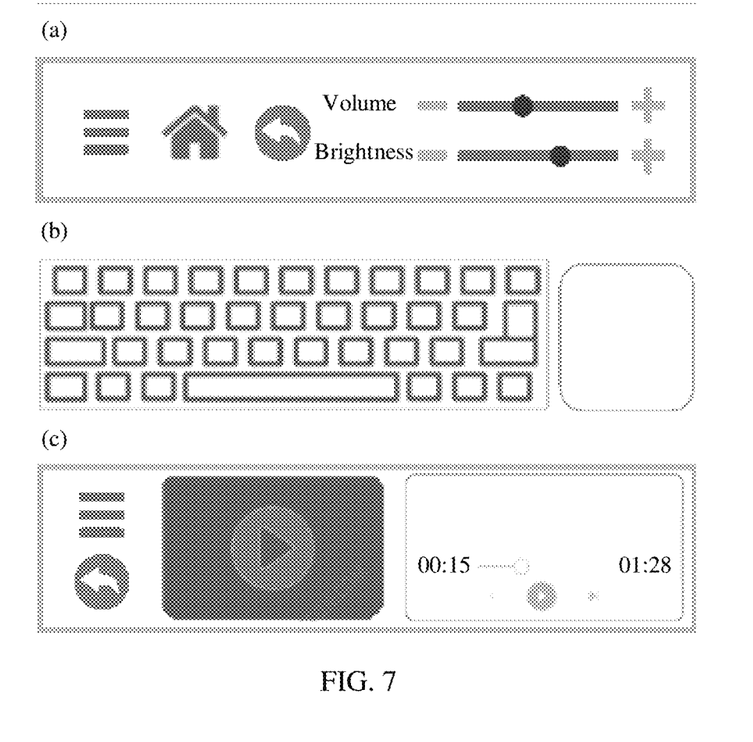
FIG. 7 is a schematic diagram of a touchscreen provided by a display apparatus according to this application.

FIG. 7 is a schematic diagram of a touchscreen of a display apparatus according to an embodiment of this application.

The touchscreen may be a control panel of the display apparatus. As shown (a) in FIG. 7, after a user adjusts brightness or contrast by using the touch control panel and then the signal detection module 32 in the touch control unit 30 detects the operation of the user, the signal processing module 33 generates an adjustment instruction, and inputs the adjustment instruction to the processor 201. The processor 201 sends a corresponding adjustment signal to the display circuit 1028 based on the adjustment instruction, so that the imaging component 1029 adjusts brightness or contrast of a displayed image. Alternatively, the display apparatus provided in this application may have a built-in sound. By sliding a volume button on the control panel, a corresponding operation instruction is output by the signal processing module 33 to the speaker/loudspeaker by using the processor 201, to perform volume control.

In addition, the touch projection interface may also be a keyboard and/or mouse control board. As shown (b) in FIG. 7 a projected keyboard and mouse may replace an actual keyboard and touchpad. When the user touches a keyboard key, a corresponding keyboard instruction is output to the processor 201 for processing. In this application, the touchscreen provided by the display apparatus may further include a control placement area or a small screen placement area (for example, a music control (c) in FIG. 7) of an application run on the processor 201, and a corresponding operation instruction is fed back by the signal detection module 32 to the processor 201 for processing. The display apparatus provided in embodiments may implement an entertainment function.

Figure 8:
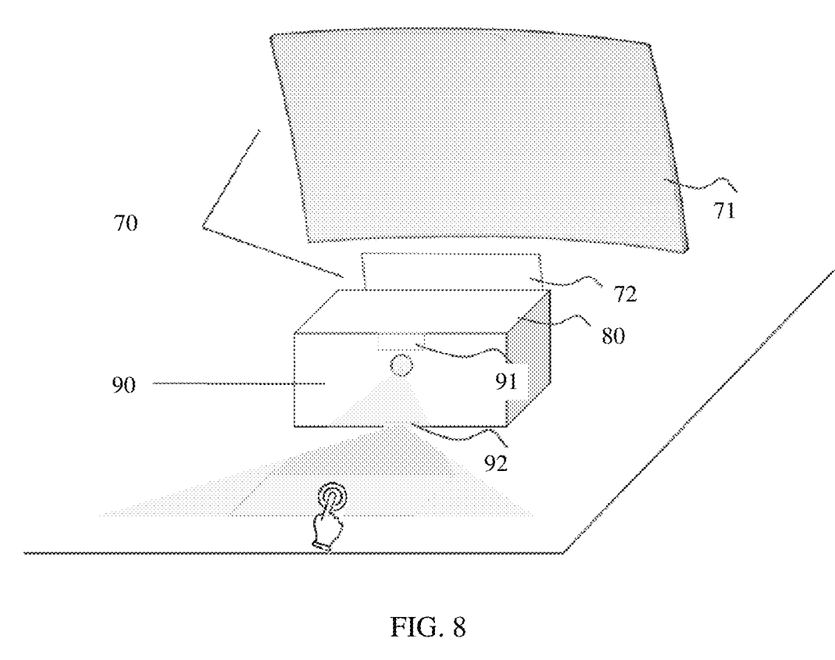
FIG. 8 is a schematic diagram of a structure of still another display apparatus according to an embodiment of this application.
Figure 9:
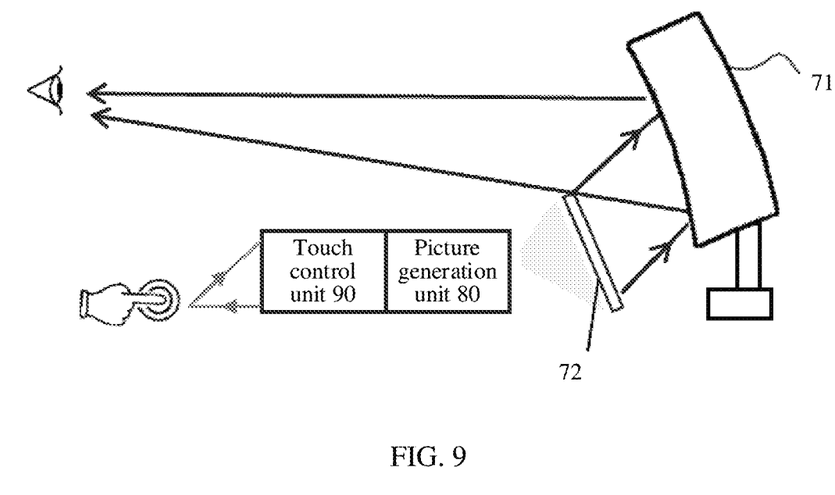
FIG. 9 is a side view of a display apparatus according to an embodiment of this application.

Refer to FIG. 8 and FIG. 9. FIG. 8 is a schematic diagram of another display apparatus according to an embodiment, and FIG. 9 is a side view of the display apparatus in FIG. 8.

The display apparatus provided in embodiments of this application includes a housing (not shown in FIG. 8 and FIG. 9), and an enlarging and display unit 70, a picture generation unit 80, and a touch control unit 90 that are located in the housing.

As shown in the figure, the enlarging and display unit 70 includes a curved mirror 71 and a diffusion screen 72. A source image generated by the picture generation unit 80 is diffusely reflected by the diffusion screen 72, and then is reflected to human eyes by the curved mirror 71. The curved mirror 71 may be an observation window of a user. In a process of using the display apparatus, the user may see a virtual image that is enlarged by several times by using the curved mirror 71.

In addition, the picture generation unit 80 further generates and projects a touchscreen outwards (for example, a rectangular area in which a finger is located in FIG. 8).

The touch control unit 90 may be integrated with the picture generation unit 80. The touch control unit 90 includes a signal transmission module 92 and a signal detection module 91. The signal transmission module 92 is configured to transmit an infrared or a laser signal to the touchscreen. The signal detection module 91 is configured to detect a signal reflected after the user touches the touchscreen. The touch control unit 90 further includes a signal processing module, and the module is configured to process the signal detected by the signal detection module 91, to generate a control signal (an operation instruction). The control signal may include location information (for example, coordinates) and/or click information. In embodiments, the signal processing module is located inside the housing of the display apparatus, and is not shown in the figure.

An area covered by the infrared or laser signal transmitted by the signal transmission module 92 is shown in a triangular area in FIG. 8, and the area includes an area in which the touchscreen is located (that is, the rectangular area in which the finger is located).

In embodiments of this application, with reference to advantages of a small-sized display and the picture generation unit, the source image is enlarged by using the curved mirror, thereby implementing ultra-large screen viewing experience, implementing a touch control function, and improving user experience.

The curved mirror in embodiments of this application may be a multifocal and arbitrarily curved mirror. A multifocal and arbitrarily curved reflector is designed to achieve multi-person viewing.

A transportation means in embodiments of this application may be a known transportation means such as a vehicle, an airplane, a ship, or a rocket, or may be a new transportation means in the future. The vehicle may be an electric vehicle, a fuel vehicle, or a hybrid power vehicle, for example, a pure electric vehicle, an enhanced electric vehicle, a hybrid electric vehicle, a fuel cell vehicle, or a new energy vehicle. This is not specifically limited in this application. In addition, the electronic device in embodiments of this application includes a device on which the display apparatus is mounted, and may include the foregoing transportation means, or may be a medical device, an office entertainment device, or an industrial control device. This is not limited in embodiments.

The terms "first, second, third, fourth", and the like in this application are intended to distinguish between similar objects but do not necessarily indicate a specific order or sequence. It should be understood that data used in this way is exchangeable in a proper case, so that embodiments described herein can be implemented in an order not described in this application. To reflect a relationship between assemblies in different embodiments more clearly, in this application, a same reference numeral is used to represent assemblies with same or similar functions in different embodiments.

It should be further noted that, unless otherwise specified, detailed descriptions of some technical features in one embodiment may also be applied to explain corresponding technical features mentioned in another embodiment.

For same or similar parts in various embodiments in this application, refer to each embodiment. Particularly, for embodiments in FIG. 8 and FIG. 9, because embodiments are based on embodiments corresponding to FIG. 1a to FIG. 5, descriptions are simple. For related parts, refer to partial descriptions in embodiments corresponding to FIG. 1a to FIG. 5.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A display apparatus, comprising:
a picture generation unit, comprising a light source, an imaging module, a semi-reflection and semi-transmission element, a reflective element, a display lens and a touch projection module, wherein the imaging module is a liquid crystal on silicon (LCOS) chip;
an enlarging and display unit; and
a touch control unit configured to control a touchscreen;
wherein the picture generation unit is configured to generate a source image;
wherein the enlarging and display unit is configured to enlarge the source image and form an enlarged virtual image;
wherein the picture generation unit is further configured to generate and project a touchscreen image outwards, the touchscreen image representing a touchscreen;
wherein the touch control unit is configured to detect and respond to a touch operation performed by a user on the touchscreen, and wherein:
the light source is configured to input a light beam to the semi-reflection and semi-transmission element;
the semi-reflection and semi-transmission element is configured to reflect the input light beam to the imaging module;
the imaging module is configured to generate the source image and the touchscreen image based on the input light beam and to output the touchscreen image and the source image to the semi-reflection and semi-transmission element, wherein a first area of the imaging module is configured to generate the source image, and a second area of the imaging module is configured to generate the touchscreen image;
the semi-reflection and semi-transmission element is configured to output the source image to the display lens and the touchscreen image to the reflective element;
the display lens is configured to transmit the source image to the enlarging and display unit; the reflective element is configured to reflect the touchscreen image to the touch projection module; and
the touch projection module is configured to project the touchscreen image.

2. The display apparatus according to claim 1, wherein:
the light source is configured to output a light beam to the imaging module;
the imaging module is configured to generate the source image and the touchscreen image based on the input light beam; and
the touch projection module is configured to project the touchscreen image.

3. The display apparatus according to claim 1, wherein the touch control unit is further configured to generate a control signal, and send the control signal to the picture generation unit or the enlarging and display unit.

4. The display apparatus according to claim 1, wherein the touch control unit comprises a signal transmitter and a signal detector, the signal transmitter is configured to transmit an infrared signal or a laser signal to the touchscreen, and the signal detector is configured to detect a signal reflected after the user touches the touchscreen.

5. The display apparatus according to claim 4, wherein the signal detector is further configured to generate a control signal, and send the control signal to the picture generation unit or the enlarging and display unit.

6. The display apparatus according to claim 1, wherein the enlarging and display unit includes a curved mirror, a diffuser and a polarizing film, wherein the curved mirror is configured to enlarge the generated source image and form the enlarged virtual image.

7. The display apparatus according to claim 6, wherein the diffuser is configured to receive the source image generated by the picture generation unit and diffusely reflect the source image to the curved mirror.

8. The display apparatus according to claim 7, wherein the polarizing film is located behind the diffuser.

9. The display apparatus according to claim 7, further comprising:
a directional diffusion film, the directional diffusion film is located behind the diffuser, and the directional diffusion film is configured to enlarge a transverse scattering angle of the source image obtained by performing a diffuse reflection.

10. The display apparatus according to claim 6, wherein the curved mirror is a multifocal curved mirror or an arbitrarily curved mirror.

11. A transportation device, comprising a display apparatus, wherein the display apparatus comprises:
a picture generation unit, comprising a light source, an imaging module, a semi-reflection and semi-transmission element, a reflective element, a display lens and a touch projection module, wherein the imaging module is a liquid crystal on silicon (LCOS) chip;
an enlarging and display unit; and
a touch control unit configured to control a touchscreen;
wherein the picture generation unit is configured to generate a source image;

wherein the enlarging and display unit is configured to enlarge the source image and form an enlarged virtual image;

wherein the picture generation unit is further configured to generate and project a touchscreen image outwards, the touchscreen image representing a touchscreen;

wherein the touch control unit is configured to detect and respond to a touch operation performed by a user on the touchscreen, and wherein:

the light source is configured to input a light beam to the semi-reflection and semi-transmission element;

the semi-reflection and semi-transmission element is configured to reflect the input light beam to the imaging module;

the imaging module is configured to generate the source image and the touchscreen image based on the input light beam and to output the touchscreen image and the source image to the semi-reflection and semi-transmission element, wherein a first area of the imaging module is configured to generate the source image, and a second area of the imaging module is configured to generate the touchscreen image;

the semi-reflection and semi-transmission element is configured to output the source image to the display lens and the touchscreen image to the reflective element;

the display lens is configured to transmit the source image to the enlarging and display unit; the reflective element is configured to reflect the touchscreen image to the touch projection module; and the touch projection module is configured to project the touchscreen image.

12. The transportation device according to claim 11, wherein the display apparatus is mounted on a seat of the transportation means.

13. The transportation device of claim 11, wherein the enlarging and display unit includes a curved mirror, a diffuser and a polarizing film, wherein the curved mirror is configured to enlarge the generated source image and form the enlarged virtual image.

14. The transportation device of claim 13, wherein the diffuser is configured to receive the source image generated by the picture generation unit and diffusely reflect the source image to the curved mirror.

15. The transportation device of claim 14, wherein the polarizing film is located behind the diffuser.

16. The transportation device of claim 14, further comprising:
a directional diffusion film, the directional diffusion film is located behind the diffuser, and the directional diffusion film is configured to enlarge a transverse scattering angle of the source image obtained by performing a diffuse reflection.

17. The transportation device of claim 13, wherein the curved mirror is a multifocal curved mirror or an arbitrarily curved mirror.

18. The transportation device of claim 11, wherein the touch control unit is further configured to generate a control signal, and send the control signal to the picture generation unit or the enlarging and display unit.

19. The transportation device of claim 11, wherein the touch control unit comprises a signal transmitter and a signal detector, the signal transmitter is configured to transmit an infrared signal or a laser signal to the touchscreen, and the signal detector is configured to detect a signal reflected after the user touches the touchscreen.

20. The transportation device of claim 19, wherein the signal detector is further configured to generate a control signal, and send the control signal to the picture generation unit or the enlarging and display unit.

* * * * *